United States Patent [19]

Susgin

[11] Patent Number: 5,473,134
[45] Date of Patent: Dec. 5, 1995

[54] WELDING STUD FORMED FROM SHEET METAL

[75] Inventor: Detlef Susgin, Taufkirchen, Germany

[73] Assignee: HBS Bolzenschweiss-Systeme GmbH & Co. KG, Dachau, Germany

[21] Appl. No.: 291,704

[22] Filed: Aug. 16, 1994

[51] Int. Cl.⁶ .................................................. B23K 9/20
[52] U.S. Cl. ............................................... 219/98; 411/478
[58] Field of Search ..................... 219/98, 99; 411/478

[56] References Cited

U.S. PATENT DOCUMENTS

| | | | |
|---|---|---|---|
| 3,701,878 | 10/1972 | Hinden et al. | 219/98 |
| 3,762,541 | 10/1973 | Hinden et al. | |
| 3,835,285 | 9/1974 | Hinden et al. | 219/98 |
| 3,858,024 | 12/1974 | Hinden et al. | 219/98 |
| 4,031,350 | 6/1977 | Hinden et al. | 219/99 |
| 4,855,561 | 8/1989 | Hinden | 219/98 |
| 4,855,562 | 8/1989 | Hinden | 219/98 |

FOREIGN PATENT DOCUMENTS 1065971  11/1979  Canada .................... 219/98

*Primary Examiner*—Clifford C. Shaw
*Attorney, Agent, or Firm*—Foley & Lardner

[57] ABSTRACT

Welding studs are punched from a metal band in such a way that a shank 11 of the stud is formed from a metal strip which is integral with a head 10, partly cut free therefrom and bent at right angles with respect to the plane of the head 10. For sufficient bending resistance, the metal strip forming the shank 11 is bent about the shank axis, preferably to such an extent that both lateral edges 15, 16 of the strip contact each other.

10 Claims, 1 Drawing Sheet

WELDING STUD FORMED FROM SHEET METAL

BACKGROUND OF THE INVENTION

This invention relates to a welding stud having a head portion formed of sheet metal and a shank portion formed of a metal strip which is integral with piece of the sheet metal that forms the head portion. Such welding studs are typically formed with relatively large heads and are specifically useful for fixing heat insulating or sound absorbing mats or other sheets of material to metallic supports. The welding stud usually has a pointed tip which is pressed through the sheet of material into engagement with the metallic support, whereupon the welding process in performed by means of an electrode applied to the surface of the head.

A welding stud of this type is known from U.S. Pat. No. 3,835,285. The known stud is produced from a square blank of sheet metal. For forming the shank portion of the stud, a relatively wide strip is cut free from a corner of the square blank to a point beyond the center thereof and is bent at right angles. The fact that the cuts defining the shank portion extend diagonally with respect to the square head portion results in a relatively long shank. Depending on the thickness of the sheet of material to be fixed, however, the shank may still be too short or, if a larger blank is started from, the head portion may become unnecessarily large.

If a welding stud with a relatively long shank is required, the metal strip punched from the sheet metal blank has a relatively small stiffness. This problem is particularly serious when a welding stud having a relatively small head and a relatively long shank is produced from sheet metal and the metal strip forming the shank is partly cut free from the head portion, but is formed with a small width to avoid undue weakening of the head portion.

SUMMARY OF THE INVENTION

It is an object of the present invention to provide a welding stud which has sufficient strength and stiffness and can be manufactured from sheet metal at low expense.

This object is met by a welding stud which has a sheet metal head portion defining a plane and a shank portion formed of a metal strip integral with the head portion and defining a shank axis extending transversely of the plane, wherein the metal strip is shaped into a non-straight cross-sectional configuration. Due to this configuration, the shank portion has a high resistance against bending and buckling even when the overall stud is made of relatively thin sheet metal, which is advantageous in view of cost and weight.

The cross-section of the shank portion is preferably U- or V-shaped to achieve high stiffness by an inexpensive bending step.

In a preferred embodiment, the lateral edges of the metal strip forming the shank portion are bent towards each other to form a substantially closed profile, with the surfaces forming the lateral edges facing the interior of the shank profile. This results in a further increase of the stiffness and also avoids sharp cutting edges along the shank portion.

The head portion is preferably provided with one or more grooves which are useful in assisting the mutual alignment of studs in a stacked condition. They are further advantageous if welding studs with relatively large heads are produced from relatively thin sheet metal. With a rectangular head portion, a plurality of straight grooves may be formed so as to extend parallel to the edges of the head. Alternatively, one or a plurality of more or less completely closed annular or square grooves may be provided.

In another preferred embodiment, the surface of the head portion which faces the shank portion, and the outer surface of the shank portion are provided with an electrically insulating coating. In this embodiment, the welding stud is specifically suited for fixing sheets of material provided with metallic surface layers. The insulation formed on the lower surface of the head and the outer surface of the shank prevents undesired current flow between the welding stud and the metal layer during the welding process. The insulating layer may be formed by a coating of synthetic resin or by an electrically insulating paint.

In a preferred method of manufacturing welding studs described of the type described above comprises punching a blanks from a band of sheet metal, each blank having a rectangular head portion and a strip-shaped extension projecting substantially from the center of one side of the rectangular head portion to form the shank portion, adjacent blanks being disposed in the band of sheet metal with orientations rotated 180° with respect to each other such that the head portion of each blank lies between the strip-shaped extensions of the respective adjacent blanks. Waste is thus reduced to a minimim.

To render the punching process as simple and economic as possible, the width of the metal band corresponds to the length of a blank measured from the tip of the strip-shaped extension to the remote edge of the rectangular head portion. Preferably, punching the blanks from the metal band, forming a bend at the root the shank portion, and bending the strip-shaped extension about the shank axis are performed in one step.

If the metal band has an electrically insulating coating on one of its surfaces, the bends are made such that in the finished welding stud the coating exists on the surface of the head portion adjacent the shank portion and on the outer surface of the shank portion. Further, the metal band is punched in the direction away from the coated surface, to cause any punching burr to face away from the coated side. Any such burrs are thus prevented from resulting in electrical contact with a metal layer that may be provided on the sheet of material to be fixed by the welding stud.

DETAILED DESCRIPTION OF A PREFERRED EMBODIMENT

Figure 1:
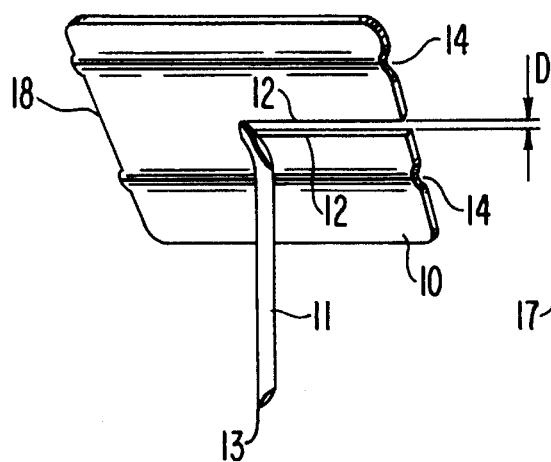
FIG. 1 is a perspective view of a welding stud produced from a sheet metal blank.

As shown in the somewhat schematic representation of FIG. 1, the welding stud consists of a head 10 in the form of a rectangular, preferably square, plate of sheet metal with rounded corners, and a shank 11 formed of a strip of the sheet metal bent at right angles with respect to the head 10. The metal strip is partly confined by cuts 12 which extend from the center of one lateral edge of the head 10 somewhat beyond the center of the head. The end of the metal strip forming the shank 11 is triangularly cut to form a pointed tip 13. The two halves of the head 10 formed by the cuts 12 are each provided with a groove 14 which extends across the head 10.

Figure 2:
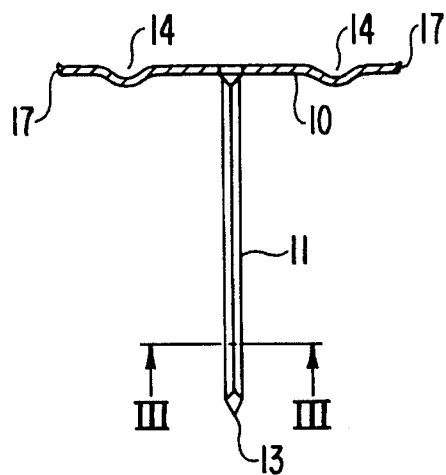
FIG. 2 is a side view of the welding stud of FIG. 1, with the head portion shown in cross-section.
Figure 3:
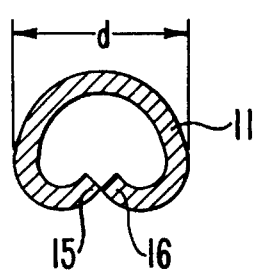
FIG. 3 shows a cross-section through the shank portion, taken along the line III—III in FIG. 2.

Referring to FIGS. 2 and 3, the metal strip forming the shank 11 is bent around the longitudinal axis of the shank to provide the shank 11 with sufficient resistance to bending and buckling about a transverse axis. The bend may be result in a simple U- or V-shaped cross-section.

In the embodiment shown in FIG. 3, the bending step has been performed to such an extent that both longitudinal edges 15, 16 of the metal strip forming the shank 11 contact each other to form a substantially closed profile, wherein the lateral surfaces which form the longitudinal edges 15, 16 of the metal strip face the interior of the cross-section. The tubular structure thus produced has excellent stiffness and permits fixing dense and heavy sheets of material even if the stud is manufactured from relatively thin sheet metal to save cost and weight.

The cross-sectional shape shown in FIG. 3 is advantageous also for the reason that sharp punching burrs which are sometimes formed along the longitudinal edges 15, 16 of the blank are turned inwardly thereby avoiding injuries.

The sheet metal from which the welding studs are punched has one of its surfaces coated with an electrically insulating material (not shown). The coating may consist of synthetic resin or an electrically insulating paint or lacquer. In producing the welding stud, the forming steps are carried out in such a way that the insulating coating is exposed on the lower surface of the head 10 and the outer surface of the shank 11.

With a welding stud that is electrically insulating as described above, the cross-sectional shape shown in FIG. 3, with the lateral edges 15, 16 of the metal strip forming the shank 11 turned inwardly and bent towards each other, provides the additional advantage that it prevents electrical contact between an electrically conductive layer provided on the insulating mat or other sheet of material to be fixed and metallic surface portions of the welding stud.

For the same reason, the punching step is carried out in such a direction that any punching burrs 17 formed at the periphery of the head 10 are turned upwardly, as shown in FIG. 2. This again serves to avoid electrical contact with an electrically conductive layer at these locations.

When used for fixing metal-coated sheets of material, the grooves 14 not only have a reinforcing function but may also serve as spacers to keep the conductive surface layer out of contact with the uppermost portion of the shank 11 where the shank profile is not closed. To obtain this advantage, it is necessary for the grooves to be of sufficient depth.

Figure 4:
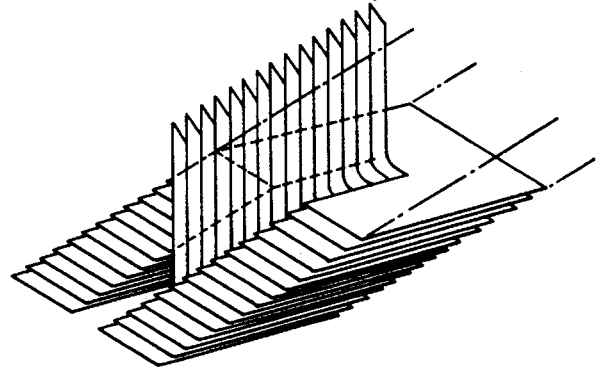
FIG. 4 is a perspective view of a number of welding studs of FIG. 1 stacked upon each other.

FIG. 4 schematically shows a number of welding studs according to FIGS. 1 to 3 stacked upon each other. Due to the bending of the shank 11 about its longitudinal axis, the spacing D (FIG. 1) between the cuts 12 formed in the head 10 is somewhat wider than the diameter d (FIG. 3) of the finished shank 11. As a result, the welding studs may be stacked or nested in the manner illustrated in FIG. 4, which is preferable not only from the points of view of packing, shipping and storing, but also with respect to permitting individual welding studs to be automatically and consecutively fed to the welding location, such as by means of a correspondingly designed magazine mounted on the welding apparatus.

The grooves 14 provided in the head 10 assist the correct mutual alignment of the studs in such stacking.

Figure 5:
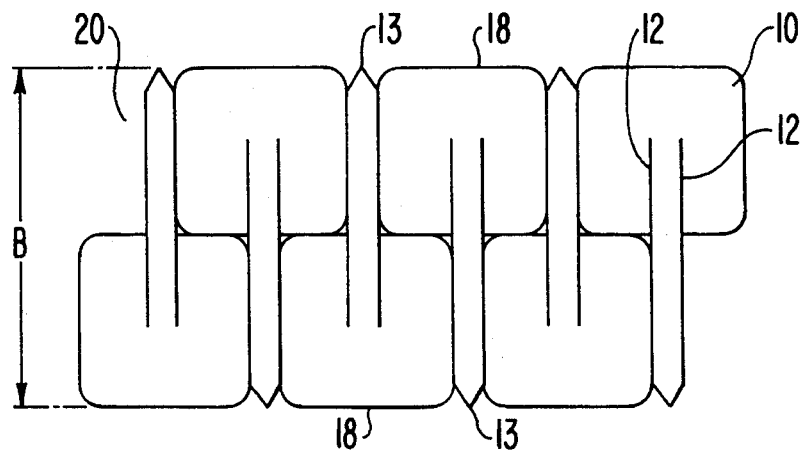
FIG. 5 illustrates the layout of welding stud blanks to be punched from a metal band.

Turning to FIG. 5, blanks for the above-described welding studs are punched from a band 20 of sheet metal, the band having a width B dimensioned such that it just corresponds to the dimension of the blank as measured from the tip 13 of the shank 11 to the remote edge 18 of the head 10. The blanks are disposed and oriented in the band 20 in such a way that adjacent blanks are mutually rotated by 180°. Thus, prior to the punching step, the metal strip forming the shank 11 is positioned between the heads 10 of the two adjacent blanks.

The punching step not only separates the individual blanks from each other. At the same time the cuts 12 which partly separate the shank 11 from the head 10, the rounded edges of the head 10, and the oblique cuts for the pointed shank tip 13 are formed.

Using a suitable punching press, the punching step is immediately followed by a bending step to bend the metal strip constituting the shank 11 of each blank about the shank axis and simultaneously bend the head 10 at right angles with respect to the root of the metal strip.

If one surface of the metal band 20 is provided with an electrically insulating coating, the punching step is carried out from the coated surface so that any punching burrs will face away from the coated side. Assuming the coated surface is the side seen in FIG. 5, the punching is performed downwards. In the same manner, the bending step for forming the shank portions 11 is carried out in the downward direction with respect to the drawing plane of FIG. 5. In the finished welding stud, the coated side is therefore the lower surface of the head 10 and the outer surface of the shank 11.

What is claimed is:

1. A weld stud having a sheet metal head portion defining a plane and a shank portion formed of a metal strip integral with the head portion and defining a shank axis extending transversely of said plane, said metal strip being shaped into a non-straight cross-sectional configuration, wherein the lateral edges of the metal strip forming said shank portion are bent toward each other to form a substantially closed profile and the surfaces formed by said lateral edges face the interior of said profile.

2. The welding stud of claim 1, wherein said head portion is provided with groove means projecting in the direction of said shank portion.

3. The welding stud of claim 1, wherein the outer surface of said shank portion and the surface of said head portion facing the shank portion are provided with an electrically insulating coating.

4. A method of producing welding studs from blanks from a band of sheet metal having an electrically insulating coating on one of its surfaces, each blank having a rectangular head portion and a strip-shaped extension connected thereto and projecting substantially from the center of one side of said rectangular head portion to form a shank portion having a longitudinal axis, the method comprising the steps of:

arranging blanks on said band of sheet metal so that adjacent blanks are oriented 180° with respect to each other, with the head portion of each blank lying between the strip-shaped extension of the adjacent blanks, punching each blank from the metal band, bending the shank portion about a point where said shank position is connected to said head portion, to a position generally perpendicular to said head portion, and bending the shank position about its longitudinal axis, and wherein said steps of punching and bending are performed in one operation, and wherein the bends are such that said one surface of said blank having the electrically insulating coating faces the outer surface of the shank position similarly having the insulating coating.

5. The method of claim 4, wherein the width of the metal band is selected such that it corresponds to the length of a welding stud blank as measured from the tip of the strip-shaped extension to the remote edge of the rectangular head portion.

6. The method of claim 4, wherein the metal band is punched in the direction away from the coating surface.

7. A method of producing welding studs each having a sheet metal head portion defining a plane and a shank portion defining a shank axis extending transversely of said plane, said studs being formed from blanks on a band of sheet metal having as electrically insulating coating on one of its surfaces, the method comprising:

punching said welding stud blanks from the band of sheet metal, bending said shank portion with respect to said head portion, and bending said shank portion about the shank axis, wherein the bending steps are performed such that in the finished welding stud the insulating coating exists on said one surface of the head portion and on the outer surface of the shank portion, said one surface facing said outer surface of the shank portion.

8. The method of claim 7, wherein the step of bending said shank portion about its axis is performed so that the lateral edges of said shank portion are bent toward each other to form a substantially closed profile and the surfaces formed by said lateral edges face the interior of said profile.

9. The method of claim 7, wherein the metal band is punched in the direction away from the coated surface.

10. The method of claim 7, wherein said head portion is provided with groove means projecting in the direction of said shank portion.

\* \* \* \* \*